April 3, 1934.  P. F. COLLINS  1,953,075

DENTAL INVESTMENT COMPOSITION AND PROCESS

Filed Nov. 11, 1932

Inventor
Paul Francis Collins.
By Edwin S. Clarkson
Attorney

Patented Apr. 3, 1934

1,953,075

UNITED STATES PATENT OFFICE 1,953,075

DENTAL INVESTMENT COMPOSITION AND PROCESS

Paul Francis Collins, Columbus, Ohio, assignor to The Columbus Dental Manufacturing Company, Columbus, Ohio, a corporation Application November 11, 1932, Serial No. 642,317

3 Claims. (Cl. 22—188)

This invention relates to certain new and useful improvements in dental investment compounds or compositions. The invention has for its primary object the protection of precious metals, used in dentistry, from the corrosive actions thereon which occur in the casting of metals, and especially in the soldering of such metals, as practiced by the use of investment compositions heretofore known and employed.

A further and more particulalr object of my invention is to provide an investment compound of such character as to protect previously shaped or prepared pieces of embedded precious metal or precious metal alloys, such as clasps, bars, backings, etc., from the corrosive actions thereon and other deteriorations, commonly heretofore caused by investment compounds commonly used and which corrosive action and deterioration commonly occur during the drying-out and heating-up processes, to which the same have been commonly subjected.

A still further object of my invention is to provide an investment compound containing or including a protective agent of such a character as to prevent injury to embedded metals from the corrosive action of a corrosive gas or gases generated in the compound during steps of the operation in a casting (especially contact-casting) or soldering process.

The dental investment compounds generally heretofore used contain from 19% to 55% of a gypsum product (used as a binder) such as plaster of Paris in combination with a suitable refractory base, such as from 35% to 80% silica. In addition to these ingredients, other materials, such as boric acid, graphite, asbestos fibre, pumice stone, etc., have been used singly or in combination in quantities up to about 15%. Small percentages of coloring matter are also sometimes added.

Investment compounds are used in dentistry for two specific purposes. First, to retain the segments of a bridge or like dental restoration, in proper relation to each other, while the technician is uniting the segments together with dental solder which is commonly a precious metal or alloy. Secondly, investment materials are used in casting processes, wherein the pattern is made of wax, then surrounded by the investment material, made plastic by adding water, the positioning of which material is accomplished by pouring or vibrating the same into a dental casting ring, wherein the investment remains undisturbed until it has air set. A specific case of casting is "contact casting" wherein molten precious metal is flowed into a preshaped cavity adjacent to a preformed precious metal plate, clasp, or the like.

In the first-mentioned use, wherein investments are employed for holding the metal pieces during soldering, it is the common practice to temporarily unite the segments of a bridge, or other like dental restoration, with a sticky or adhesive wax, then to embed (wholly or partly) the bridge in an advantageous position in a soldering investment composition which has been mixed to a workable consistency by the addition of water. When the investment compound has become air set, the wax is usually removed by pouring boiling water over the embedded bridge and the investment. Next the invested bridge is placed over a fire or in an oven to dry, at a temperature of from 200° F. to 850° F. After the excess moisture has been expelled from the investment, the temperature of the mass is elevated to a higher temperature, of from 900° F. to 1875° F., and the segments of the bridge are united by the melting and flowing of dental solder over and in contact with the parts.

In the second-named use, wherein the investment material is used for casting, it is the common practice to dry out the investment material, after it has become air set, at a temperature of from 200° F. to 850° F., thereby dissipating the excess moisture and the wax present, and then to increase the heat to substantially dissipate most of the chemically combined moisture and wax residues present, and continuing the heating action until a desired casting temperature is reached, usually from 900° F. to 1600° F., whereupon the bridge or other type of dental casting is made by forcing molten dental alloy into the dissipated wax pattern cavity.

The contact casting will be discussed in connection with the description of the drawing.

In such soldering and contact casting procedures, it often happens that a preshaped piece of precious metal or precious metal alloy is embedded (wholly or partly) in the investment and the subsequent soldering or casting operation demands the flowing of solder thereon or the casting of a shape of precious metal or precious metal alloy thereto. This embedded metal often breaks down or deteriorates due to the corrosive action on the metal by the products of certain reactions which take place in the investment material while subjected to the high heat from 900° F. to 1600° F. during the casting or soldering operation. My observation in practice has shown that this corrosive action on the metal is caused by a gas or gaseous compound generated in or liberated from the investment material during the drying-out and heating-up steps of treatment. This corrosive gas or gaseous compound is especially active when wax is attached to the embedded metal, but it is also quite corrosive in its action even in the absence of wax. The corrosive action may be sufficiently severe to materially impair the strength and other desirable properties of silver, copper, nickel and palladium and alloys thereof with gold to a marked degree, and to have a slight deleterious effect on platinum and alloys thereof. The corrosive action is particularly severe on the best of dental precious metal alloys which are extensively used in dental work. The corrosion of the metal in a tooth backing or in the metal of bridgework results in the production of a faulty article, which is structurally weak and liable to break in the mouth, and, even in the case of slightly corroded metal, the action is liable to become progressive and result in course of time in the complete breaking down of the metal article so as to render the article useless. These corrosive actions, which cause loss of time and materials to the dentist, often do not show up until after the work is completed and installed, with later distress to the patient and worry and expense to both the patient and dentist.

Heretofore it was believed that failures of this nature were caused by overheating the casting gold or through some error in technic, but I have discovered, as stated, that the corrosive action is due to the presence in the investment compound of a corrosive gas or gaseous compound, liberated or generated by the action of heat during the drying-out and heating-up processes, and which gas attacks the metal in a greater or less degree according to the character of the metal and amount of gas present and conditions under which the soldering or casting action is carried out. It is my belief, that the above mentioned deterioration of the metal insets may be caused largely by sulphur compounds, which are gases at high temperatures, perhaps derived from the sulphur of the gypsum and/or from the sulphur content of the gas burned to heat the investment mold. My researches have shown that the corrosive effect on the embedded metal is a direct function of the temperature and length of time of heating-up employed. It has also been my observation that the presence of carbonaceous residues from the incomplete combustion of waxes employed and the use, during the drying and heating processes of a gas or gas-air furnace, burner or hotplate in which combustion is not complete, are factors, in combination with the reducing atmosphere inherent within the investment itself, all having a marked effect in accelerating or increasing the power of this corrosive reaction at higher temperatures and with increased periods of time.

As a result of long and extensive experiments made by me, in order to overcome this difficulty and prevent such corrosion of the metals, I discovered that by adding a suitable additional ingredient to the conventional investment compounds, I can substantially eliminate all the deleterious effects of the gas or gaseous compounds which may be liberated or formed in the investment material upon the embedded metal throughout all the practical ranges of drying-out and heating-up temperatures. The ingredient added is an agent, composed of one or more materials which I have found capable of acting to prevent corrosive action of the gas or gases or gaseous compounds on the metals. The function of this agent in the investment and in the presence of generated gases or gaseous compounds appears to be that of an adsorptive, which adsorbs and/or combines with the deleterious gas or gaseous compounds substantially as rapidly as they are formed and in this way protects the embedded metal from damage.

The deterioration herein referred to does not seem to be merely an oxidation of the embedded metal. I believe oxidizing reaction may occur more or less in the early stages of drying-out and heating-up, but with prolonged time and increased temperature the oxidizing atmosphere surrounding the embedded alloy becomes less and less and somewhere between 800° F. and 1600° F. ceases to exist. It then becomes a reducing atmosphere.

This change from oxidizing to reducing may be caused in part by the wax, and in part by the products of incomplete combustion from the heating flame.

In the corrosive action which I have discovered, in association with investment compounds, the effect on the embedded metal or alloy progresses deeply inward and in time may result in the absolute destruction of the metal piece for practical purposes. Furthermore, this corrosive action is especially active in a reducing atmosphere where the oxygen content is substantially absent or present only in fluctuating short periods of time at increasing temperatures above 900° F. Even those alloys which are highly resistant to oxidation are not impervious to deterioration from the effects of this corrosive action.

Adsorptive or protecting agents which are claimed in the present application, and which are very satisfactory, are the oxides of calcium, of barium and of aluminum, preferably used in very fine powders, thoroughly mixed with the investment composition. The amount of the added adsorptive material may be varied with respect to the other ingredients, in quantities less than 40%, and between 0.1% and 40%, depending on the efficiency of the material and the particular character and requirements of the investment compound.

For the purpose of illustrating an exemplificative mode of use of my improved investment compound, I have shown in the accompanying drawing the use of the compound in a dental casting process involving the casting of molten metal against an embedded backing composed of a precious metal alloy. In the said drawing:—

Figure 1:
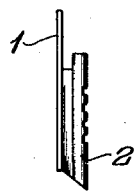
Fig. 1 is a side elevation of a backing made of a precious metal alloy.
Figure 2:
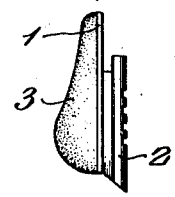
Fig. 2 shows the backing with a wax pattern applied thereto for the formation of a lingual backing surface resembling the lingual shape of a normal tooth.
Figure 3:
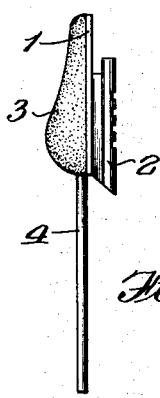
Fig. 3 shows the backing and wax pattern with a metal sprue pin applied.
Figure 4:
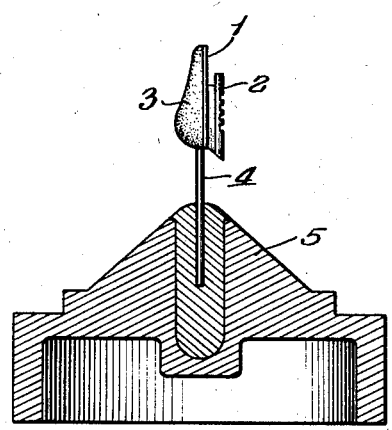
Fig. 4 shows the parts illustrated in Fig. 3 applied for cooperation with a sprue former.
Figure 5:
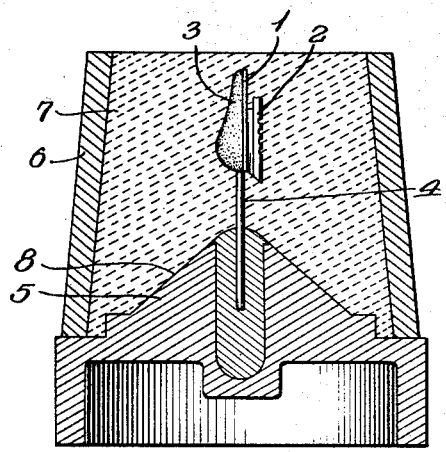
Fig. 5 shows the parts illustrated in Fig. 4 with a casting ring fitted upon the sprue former and the casting ring filled with investment material.
Figure 6:
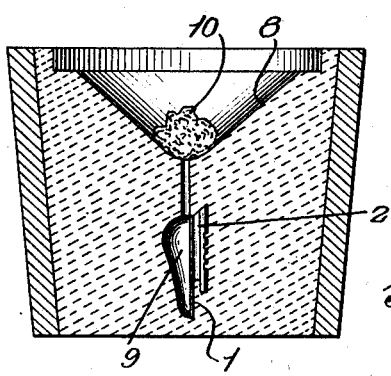
Fig. 6 shows the casting ring and elements therein removed from the sprue former and inverted, and with the sprue pin detached, preparatory to the casting action.
Figure 7:
Fig. 7 is a view of the completed backing.

In the process of casting a precious metal or precious metal alloy upon the backing plate 1 carried by the post 2, a wax pattern 3, shaped to conform to the contour of the lingual surface of a natural tooth, is applied to the backing plate, as shown in Fig. 2. A sprue pin 4 is then applied by forcing one end thereof into the wax pattern, after which the backing and applied parts are mounted upon a sprue former 5. A casting ring 6 is disposed upon the sprue former so as to surround the backing, and the ring then filled with the investment material 7 so as to invest the backing and its applied parts therein, with the exception of the outer end of the sprue pin which is disposed within a recess in the cone-shaped part of the sprue former whereby a cavity 8 is produced in the compound. The ensemble of backing, pattern, pin and casting ring with the investment compound are then removed from the sprue former and the metal pin or sprue removed from the wax, leaving a sprue hole extending from the inner end of the cavity 8 into the wax pattern. The casting ring is then placed on a low heat fire whereby the investment compound and wax are subjected to a temperature of from 200° F. to 800° F. to dry out the compound and melt the wax; some of the wax being volatilized and some penetrating into the pores of the investment. The removal of the wax leaves the forming cavity 9 in the investment material communicating with the sprue hole. In this operation the removal or dissipation of the wax is not necessarily complete; a certain amount of the wax residue adhering to the walls of the cavity 9 and remaining in the pores of the surrounding investment. The ensemble is then treated to a higher degree of heat, at a temperature of from 900° F. to 1600° F., for the purpose of driving off the chemically contained water in the investment material and to substantially dissipate any remaining wax residues and to expand the investment to counteract for shrinkage of gold on cooling. The ensemble is then inverted, a nugget of gold or precious alloy 10 is placed in the cavity 8, as shown in Fig. 6, and the nugget melted by the action of the heat of an intense flame and a dental casting machine of suitable type and operating by pressure, centrifugal force or suction, employed to force the molten precious metal through the sprue hole into the cavity 9 and to cast a precious metal portion 11 upon the backing plate.

In the casting operation above-described corrosive gases are generated in the investment material which (when using the conventional investment compositions of the prior art) come in contact with the backing and cause the deleterious corrosive action referred to. The compound 7, however, when provided with my adsorptive agent, prevents this deleterious action of the gases on the metal. As stated, this agent apparently acts by adsorption to remove the gases or gaseous compounds substantially as rapidly as they are formed and in this way protects the embedded metal or alloy from damage. In the casting or soldering operations using my improved investment compound, the embedded metal remains structurally sound. The surface is substantially unattacked by the corrosive gases and the physical properties of the metal are unimpaired. The result is a prolonged life and a more satisfactory service of the precious metal backing or alloy as a part of an artificial tooth, bridgework or other piece of dental restoration. Therefore, it is to be understood that my investment compound has many advantages which constitute a marked improvement over the results obtained in the use of investment compounds of the kinds heretofore employed.

What I claim is:—

1. A dental investment composition of the type composed largely of an insoluble refractory siliceous material and a calcium sulphate binder, to which is added an oxide of an alkaline earth metal.

2. A dental investment composition of the type composed largely of an insoluble refractory siliceous material and a calcium sulphate binder, to which is added an oxide selected from the herein described group consisting of aluminum, calcium and barium oxides, in an amount not above 40% of the investment composition.

3. In casting precious metal upon preshaped precious metal pieces, in an investment, the herein described step of performing the casting in an investment comprising a refractory siliceous material and a calcium sulphate binder, which investment also contains an addition of an oxide of a metal selected from the herein described group consisting of aluminum, calcium and barium.

PAUL F. COLLINS.